United States Patent Office 3,778,433
Patented Dec. 11, 1973

3,778,433
PROCESS FOR PRODUCING BENZODIAZEPINE DERIVATIVES
Hisao Yamamoto, Nishinomiya, Shigeho Inaba, Takarazuka, Toshiyuki Hirohashi, Ashiya, Michihiro Yamamoto, Toyonaka, Kikuo Ishizumi, Minoo, Mitsuhiro Akatsu, Ikeda, Isamu Maruyama, Minoo, Yoshiharu Kume, Takarazuka, Kazuo Mori, Kobe, and Takahiro Izumi, Takarazuka, Japan, assignors to Sumitomo Chemical Company, Ltd., Osaka, Japan
No Drawing. Filed Apr. 7, 1970, Ser. No. 26,409
Claims priority, application Japan, Apr. 18, 1969, 44/30,601, 44/30,603, 44/30,606; Apr. 24, 1969, 44/32,220; May 28, 1969, 44/41,873; May 29, 1969, 44/42,213; July 3, 1969, 44/52,868
Int. Cl. C07d 53/06
U.S. Cl. 260—239.3 D           6 Claims

ABSTRACT OF THE DISCLOSURE

A novel process for producing benzodiazepine derivatives, which have prominent effects as tranquilizer, muscle relaxant, antispasmodic, anticonvulsant and hypnotic, represented by the formula,

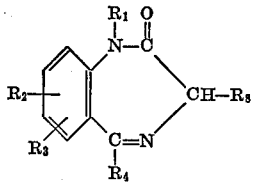

wherein $R_1$ represents hydrogen, alkyl, alkenyl, alkynyl, haloalkyl, trifluoroalkyl, cyanoalkyl, cycloalkylalkyl, alkoxyalkyl, alkylthioalkyl, alkenyloxyalkyl, carbamoylalkyl, alkylcarbamoylalkyl, acyloxyalkyl, alkylcarbonylalkyl, phenylalkyl, substituted phenylalkyl, unsubstituted or substituted aminoalkyl or substituted carbamoylalkyl; $R_2$ represents hydrogen, halogen, alkyl, nitro cyano, trifluoromethyl, trifluoromethoxy, dialkylamino, piperidino, alkoxy, alkylthio, alkylsulfonyl, alkylsulfinyl, carbamoyl or sulfamoyl; $R_3$ represents hydrogen, nitro, alkyl or halogen; $R_4$ represents alkyl, cycloalkyl, cycloalkenyl, unsubstituted or substituted phenyl, phenylalkyl or heterocycle; $R_8$ represents hydrogen, alkyl, alkoxyalkyl, alkylthioalkyl, phenyl, halogenated or alkoxylated phenyl, or benzyl. These benzodiazepine derivatives are produced by reacting an aminophenyl ketone derivative represented by the formula,

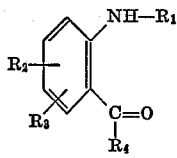

wherein $R_1$, $R_2$, $R_3$ and $R_4$ are as defined above, with an oxazolid-2,5-dione or thiazolid-2,5-dione derivative represented by the formula,

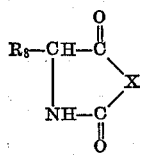

wherein $R_8$ is as defined above and X represents oxygen or sulfur.

This invention relates to a novel process for producing benzodiazepine derivatives. More particularly, this invention pertains to a novel process for producing benzodiazepine derivatives, and salts thereof, represented by the formula,

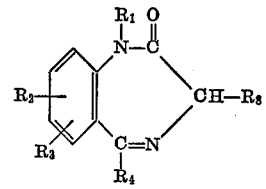

(I)

wherein $R_1$ represents hydrogen, $C_{1-4}$ alkyl, $C_{2-4}$ alkenyl, $C_{3-4}$ alkynyl or a group of the formula, $C_nH_{2n}R_5$ wherein $n$ is an integer of 1 to 4 and $R_5$ represents halogen, trifluoromethyl, cyano, $C_3$–$C_7$-cycloalkyl, $C_{1-4}$ alkoxy, $C_{1-4}$ alkyl-thio, $C_{2-4}$ alkenyloxy, carbamoyl, ($C_{1-4}$ alkyl)carbamoyl, acyloxy, $C_{1-4}$ alkylcarbonyl, phenyl, substituted phenyl, or $R_5$ represents a group of the formula,

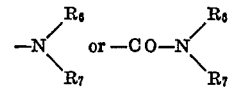

wherein $R_6$ signifies hydrogen or $C_{1-3}$ alkyl and $R_7$ signifies $C_{1-3}$ alkyl, provided that $R_6$ and $R_7$ may form an optionally substituted 5- or 6-membered heterocyclic ring together with the adjacent nitrogen atom, and said heterocyclic ring may further contain a hetero atom; $R_2$ represents hydrogen, halogen, $C_{1-4}$ alkyl nitro, cyano trifluoromethyl, trifluoromethoxy, di-($_{1-4}$-alkyl)amino, piperidino, $C_{1-4}$-alkoxy, $C_{1-4}$ alkyl-thio, $C_{1-4}$ alkyl-sulfonyl, $C_{1-4}$ alkylsulfinyl, carbamoyl or sulfamoyl; $R_3$ represents hydrogen, nitro, $C_{1-4}$ alkyl or halogen. $R_4$ represents $C_{1-4}$ alkyl, $C_{3-7}$ cycloalkyl, cycloalkenyl, phenyl, substituted phenyl, phenyl-$C_{1-3}$ alkyl or a heterocycle; $R_8$ represents hydrogen, $C_{1-4}$ alkyl, $C_{1-4}$ alkoxy-$C_{1-4}$ alkyl, $C_{1-4}$ alkylthio-$C_{1-4}$ alkyl, phenyl, phenyl substituted by halogen or $C_{1-2}$ alkoxy, benzyl or hydroxybenzyl.

In the compound represented aforesaid Formula I, the $C_1$–$C_4$ alkyl can be, illustrated, methyl, ethyl, n-propyl, isopropyl, n-butyl, isobutyl and tertiary butyl; the $C_{2-4}$ alkenyl refers to groups such as allyl, butenyl (including the various isomers) and the like. The $C_{3-4}$ alkynyl is preferably, for example, propargyl. The $C_3$–$C_7$ cycloalkyl includes, for example, cyclopropyl, cyclobutyl, cyclopentyl, cyclohexyl and cycloheptyl; the $C_{1-4}$ alkoxy includes, for example, methoxy, ethoxy, n-propoxy, isopropoxy, n-butoxy and tertiary butoxy groups; and the halogen includes chlorine, bromine, iodine and fluorine.

The group of the formula, $-C_nH_{2n}-$, represents a straight chain or branched-chain alkylene group having up to 4 carbon atoms, and includes, for example, methylene, ethylene, 1-methylethylene, 2-methylethylene, trimethylene, 1-methyltrimethylene and 2-methyltrimethylene groups. In case $R_6$ and $R_7$ form a heterocyclic ring together with the nitrogen atom, the heterocyclic group is, for example, pyrrolidino, piperazino, piperidino or morpholino group, or a substituted derivative thereof. Preferable as the substituent is an alkyl group, e.g., methyl or ethyl; a hydroxyalkyl group, e.g. hydroxyethyl; an alkoxyalkyl group, e.g. ethoxyethyl; or an alkenyloxyalkyl group, e.g. vinyloxyethyl. Advantageous heterocyclic groups are, for example, pyrrolidino, piperidino, piperazino alkyl-piperazino, alkyloxyalkyl-piperazino, and morpholino groups.

When $R_5$ represents an acyloxy group, it includes acetyloxy, propionyloxy, benzoyloxy, halobenzoyloxy, methoxybenzoyloxy, dimethoxybenzoyloxy, trimethoxybenzoyloxy, phenylacetyloxy, nicotinoyloxy, isonicotinoyloxy or the like.

When $R_4$ and/or $R_5$ represents a substituted-phenyl group or substituted benzoyloxy group, the substituents in the phenyl ring can be halogen such as fluorine, chlorine, bromine and iodine; nitro, trifluoromethyl, $C_{1-4}$ alkoxy, $C_{1-4}$ alkyl and sulfamoyl. Thus, the substituted-phenyl of $R_4$ and/or $R_5$ include 2-fluorophenyl, 2-chlorophenyl, 4-chlorophenyl, 2 - bromophenyl, 4 - bromophenyl, 2 - methoxyphenyl, 4-methoxyphenyl, 3-methoxyphenyl, 4-tolyl, 2-nitrophenyl, 4-trifluoromethylphenyl, 2-trifluoromethylphenyl, 2,6-dichlorophenyl, 2,4-dichlorophenyl, 2,3- dichlorophenyl, 2,4-difluorophenyl; 2,6-difluorophenyl, 3,4-dimethoxyphenyl, 2-chloro-4-methylphenyl, 2-methyl-4-chlorophenyl, 2-methyl-4-bromophenyl, 2-chloro - 5 - sulphamoylphenyl, 2,4,6-trichlorophenyl, 3,4,5 - trimethoxyphenyl and the like. Other substituents, in addition to those enumerated above, can be present in the phenyl group without any qualitative change in the properties of the parent compound. The heterocycle of $R_4$ includes, for example, pyridyl, pyrimidyl, pyridazinyl, pyrazinyl, thienyl, furyl, thiazoyl, oxazoyl, indolyl and a halogen- or alkyl-substituted group thereof.

The benzodiazepine derivatives represented by the Formula I have prominent effects as tranquilizer, muscle relaxant, antispasmodic anticonvulsant and hypnotic, and are of great importance as medicines.

A few processes for producing these benzodiazepine derivatives have heretofore been described. For instance, it is known to obtain the benzodiazepine derivatives by heating an o-aminophenylketone with an excess of glycine ethyl ester hydrochloride in pyridine, and then, if desired, alkylating the resulting 1-unsubstituted benzodiazepine derivative [L. H. Sternbach et al.: Journal of Organic Chemistry, 27, 3788 (1962); Journal of Medicinal Chemistry, 8, 815 (1965)]. However, this process generally requires heating the reaction mixture temperature as high as a boiling point of the solvent, and further, it is difficult to provide high yield in general, and hence, is not entirely satisfactory for large scale commercial operation.

Contrary to this known procedure, we have found, unexpectedly, that benzodiazepine derivatives of the Formula I can be smoothly and economically prepared in high yields and of high purity by reacting an o-aminophenylketone derivative of the Formula II with the 2,5-dione derivative of the Formula III. Moreover, the present invention can be conducted at a room temperature or below and provides the desired benzodiazepine derivatives in almost quantitative yields.

An object of the present invention is to provide a novel process for producing benzodiazepine derivatives. Another object of the present invention is to provide novel benzodiazepine derivatives which are useful for medicines. A further object is to provide a pharmaceutical composition containing such novel benzodiazepine derivatives. Other objects and merits of this invention will become apparent from the description that follows.

In order to accomplish these objects the present invention provides a process for producing benzodiazepine derivatives, and salts thereof, represented by the aforesaid Formula I which comprises treating an aminophenyl ketone derivative represented by the formula,

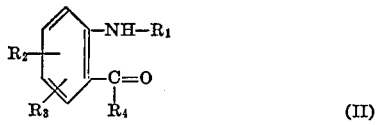

(II)

wherein $R_1$, $R_2$, $R_3$ and $R_4$ are the same as defined above with a 2,5-dione derivative represented by the formula

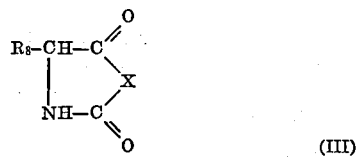

(III)

wherein $R_8$ is the same as defined above, and X represents oxygen or sulfur.

The present invention further provides novel benzodiazepine derivatives, which are useful as medicines, represented by the formula,

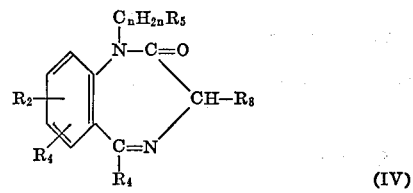

(IV)

wherein $R_2$, $R_3$, $R_4$, $R_8$ and $n$ have the same meanings as defined above; and $R_5'$ is $C_{1-4}$ alkylthio or $C_{2-4}$ alkenyloxy.

The present invention further provides a pharmaceutical composition consisting of an effective amount of benzodiazepine derivative represented by the Formula IV and a pharmaceutical acceptable carrier.

In preparing benzodiazepine derivatives according to this invention, aminophenyl ketone derivatives of the Formula II are treated with a 2,5-dione derivative of the Formula III in a solvent or solvent mixture. Suitable solvent include, for example, chloroform, carbon tetrachloride, methylene chloride, ethylene chloride, ether, diisopropyl ether, tetrahydrofuran, dioxane, water, methanol, ethanol, dimethylformamide, dimethyl sulfoxide or a mixture thereof. The reaction is, generally, carried out in the presence of an acid. The acid used in this process includes hydrogen chloride, hydrogen bromide, sulfuric acid, phosphoric acid, polyphosphoric acids, borontrifluoride and paratoluenesulfonic acid. The reaction is effected at a temperature ranging from $-25°$ C. to about $120°$ C., and more preferably from about $0°$ C. to about $30°$ C. Temperatures above and below the aforesaid ranges can also be employed but are less preferred. In most instances, the reaction can be conducted at room temperature or below. Pressure is not necessarily critical and the process can be conducted at atmospheric, subatmospheric or superatmospheric pressure. The process, if desired, can be conducted in an inert atmosphere, such as nitrogen, argon and the like.

Although the mole ratio of the 2,5-dione derivative to the aminophenyl ketone derivative is not critical, it is preferable to use at least stoichiometric amount of the reactant. In most cases, it is more preferable to use an excess of the 2,5-dione derivative.

The reactant can be, if necesary, heated in a suitable solvent, such as dimethylsulfoxide, dimethylformamide or the like, to complete the reaction.

The benzodiazepine derivative obtained according to the above-mentioned process may also be isolated in the form of an acid addition salt by treatment with an acid, e.g. a mineral acid such as hydrochloric, sulfuric, nitric, or phosphoric acid or an organic acid such as maleic, fumaric, succinic, formic or acetic acid.

According to the process of the present invention, there are produced such benzodiazepine derivatives and acid addition salts thereof as shown below.

5-phenyl-1,3-dihydro-2H-1,4-benzodiazepin-2-one
5-phenyl-6-chloro-1,3-dihydro-2H-1,4-benzodiazepin-2-one
5-phenyl-7-chloro-1,3-dihydro-2H-1,4-benzodiazepin-2-one
5-phenyl-8-chloro-1,3-dihydro-2H-1,4-benzodiazepin-2-one
5-phenyl-9-chloro-1,3-dihydro-2H-1,4-benzodiazepin-2-one
5-phenyl-7-bromo-1,3-dihydro-2H-1,4-benzodiazepine-2-one
5-phenyl-7-nitro-1,3-dihydro-2H-1,4-benzodiazepin-2-one
5-phenyl-8-nitro-1,3-dihydro-2H-1,4-benzodiazepin-2-one 5-phenyl-9-nitro-1,3-dihydro-2H-1,4-benzodiazepin-2-one
7-methyl-5-phenyl-1,3-dihydro-2H-1,4-benzodiazepin-2-one
7-methoxy-5-phenyl-1,3-dihydro-2H-1,4-benzodiazepine-2-one
8-methoxy-5-phenyl-1,3-dihydro-2H-1,4-benzodiazepin-2-one
8-methoxy-7-bromo-5-phenyl-1,3-dihydro-2H-1,4-benzodiazepin-2-one
7-trifluoromethyl-5-phenyl-1,3-dihydro-2H-1,4-benzodiazepin-2-one
6(or 8)-trifluoromethyl-5-phenyl-1,3-dihydro-2H-1,4-benzodiazepin-2-one
7-methylsulfonyl-5-phenyl-1,3-dihydro-2H-1,4-benzodiazepin-2-one
7-ethylsulfonyl-5-phenyl-1,3-dihydro-2H-1,4-benzodiazepin-2-one
7-dimethylamino-5-phenyl-1,3-dihydro-2H-1,4-benzodiazepin-2-one
7-diethylamino-5-phenyl-1,3-dihydro-2H-1,4-benzodiazepin-2-one
7-piperidino-5-phenyl-1,3-dihydro-2H-1,4-benzodiazepin-2-one
5-(o-chlorophenyl)-7-nitro-1,3-dihydro-2H-1,4-benzodiazepin-2-one
5-(o-bromophenyl)-7-nitro-1,3-dihydro-2H-1,4-benzodiazepin-2-one
5-(o-fluorophenyl)-7-nitro-1,3-dihydro-2H-1,4-benzodiazepine-2-one
5-(m-chlorophenyl)-7-nitro-1,3-dihydro-2H-1,4-benzodiazepin-2-one
5-(p-chlorophenyl)-7-nitro-1,3-dihydro-2H-1,4-benzodiazepin-2-one
5-(o-chlorophenyl)-1,3-dihydro-2H-1,4-benzodiazepin-2-one
5-(o-fluorophenyl)-1,3-dihydro-2H-1,4-benzodiazepin-2-one
5-(o-chlorophenyl)-7-chloro-1,3-dihydro-2H-1,4-benzodiazepin-2-one
5-(o-fluorophenyl)-7-chloro-1,3-dihydro-2H-1,4-benzodiazepin-2-one
5-(o-bromophenyl)-7-chloro-1,3-dihydro-2H-1,4-benzodiazepin-2-one
5-(m-chlorophenyl)-7-chloro-1,3-dihydro-2H-1,4-benzodiazepin-2-one
5-(p-chlorophenyl)-7-bromo-1,3-dihydro-2H-1,4-benzodiazepin-2-one
5-(o-chlorophenyl)-7-methoxy-1,3-dihydro-2H-1,4-benzodiazepine-2-one
5-(o-chlorophenyl)-7-methyl-1,3-dihydro-2H-1,4-benzodiazepin-2-one
5-(o-chlorophenyl)-7-dimethylamino-1,3-dihydro-2H-1,4-benzodiazepin-2-one
5-(o-fluorophenyl)-7-methyl-1,3-dihydro-2H-1,4-benzodiazepin-2-one
5-(o-fluorophenyl)-7-methoxy-1,3-dihydro-2H-1,4-benzodiazepin-2-one
5-(o-fluorophenyl)-7-trifluoromethyl-1,3-dihydro-2H-1,4-benzodiazepin-2-one
5-(o-fluorophenyl)-7-methylsulfonyl-1,3-dihydro-2H-1,4-benzodiazepin-2-one
5-(o-fluorophenyl)-7-dimethylamino-1,3-dihydro-2H-1,4-benzodiazepin-2-one
7,8-dimethyl-5-phenyl-1,3-dihydro-2H-1,4-benzodiazepin-2-one
7,8-dimethoxy-5-phenyl-1,3-dihydro-2H-1,4-benzodiazepin-2-one
7-chloro-9-methyl-5-phenyl-1,3-dihydro-2H-1,4-benzodiazepin-2-one
7-methyl-9-nitro-5-phenyl-1,3-dihydro-2H-1,4-benzodiazepin-2-one
7-methyl-5-(p-tolyl)-1,3-dihydro-2H-1,4-benzodiazepin-2-one
7-methyl-5-(p-methoxyphenyl)-1,3-dihydro-2H-1,4-benzodiapezin-2-one
7-methyl-5-(p-nitrophenyl)-1,3-dihydro-2H-1,4-benzodiazepin-2-one
1-methyl-5-phenyl-7-chloro-1,3-dihydro-2H-1,4-benzodiazepin-2-one
1-methyl-5-phenyl-7-bromo-1,3-dihydro-2H-1,4-benzodiazepin-2-one
1-methyl-5-phenyl-7-nitro-1,3-dihydro-2H-1,4-benzodiazepin-2-one
1-ethyl-5-phenyl-7-nitro-1,3-dihydro-2H-1,4-benzodiazepin-2-one
1-methyl-5-(o-chlorophenyl)-7-nitro-1,3-dihydro-2H-1,4-benzodiazepin-2-one
1-methyl-5-(o-fluorophenyl)-7-nitro-1,3-dihydro-2H-1,4-benzodiazepin-2-one
1-methyl-5-(o-chlorophenyl)-7-chloro-1,3-dihydro-2H-1,4-benzodiazepin-2-one
1-methyl-5-(o-fluorophenyl)-7-chloro-1,3-dihydro-2H-1,4-benzodiazepin-2-one
1-methyl-5-(o-fluorophenyl)-7-bromo-1,3-dihydro-2H-1,4-benzodiazepin-2-one
1-ethyl-5-(o-fluorophenyl)-7-chloro-1,3-dihydro-2H-1,4-benzodiazepin-2-one
1-propyl-5-(o-fluorophenyl)-7-chloro-1,3-dihydro-2H-1,4-benzodiazepin-2-one
1-ethyl-5-phenyl-7-chloro-1,3-dihydro-2H-1,4-benzodiazepin-2-one
1-propyl-5-phenyl-7-chloro-1,3-dihydro-2H-1,4-benzodiazepin-2-one
1-propyl-5-phenyl-7-nitro-1,3-dihydro-1H-1,4-benzodiazepin-2-one
1,7-dimethyl-5-phenyl-1,3-dihydro-2H-1,4-benzodiazepin-2-one
7-methoxy-1-methyl-5-phenyl-1,3-dihydro-2H-1,4-benzodiazepin-2-one
1-ethyl-7-methylsulfonyl-5-phenyl-1,3-dihydro-2H-1,4-benzodiazepin-2-one
1-methyl-7-methylsulfonyl-5-phenyl-1,3-dihydro-2H-1,4-benzodiazepin-2-one
7-ethylsulfonyl-1-methyl-5-phenyl-1,3-dihydro-2H-1,4-benzodiazepin-2-one
1-methyl-5-phenyl-7-trifluoromethyl-1,3-dihydro-2H-1,4-benzodiazepin-2-one
5-(o-fluorophenyl)-1-methyl-7-trifluoromethyl-1,3-dihydro-2H-1,4-benzodiazepin-2-one
5-(o-fluorophenyl)-1-methyl-7-methylsulfonyl-1,3-dihydro-2H-1,4-benzodiazepin-2-one
5-(o-chlorophenyl)-7-dimethylamino-1-methyl-1,3-dihydro-2H-1,4-benzodiazepin-2-one
7-dimethylamino-1-methyl-5-(o-trifluoromethylphenyl)-1,3-dihydro-2H-1,4-benzodiazepin-2-one
5-(o-nitrophenyl)-1,3-dihydro-2H-1,4-benzodiazepin-2-one
5-(o-nitrophenyl)-7-chloro-1,3-dihydro-2H-1,4-benzodiazepin-2-one
5-(o-nitrophenyl)-7-nitro-1,3-dihydro-2H-1,4-benzodiazepin-2-one
5-(o-nitrophenyl)-8(or 6)-nitro-1,3-dihydro-2H-1,4-benzodiazepin-2-one
5-(o-nitrophenyl)-7-methyl-1,3-dihydro-2H-1,4-benzodiazepin-2-one
5-(o-nitrophenyl)-7-trifluoromethyl-1,3-dihydro-2H-1,4-benzodiazepin-2-one
5-(p-nitrophenyl)-7-chloro-1,3-dihydro-2H-1,4-benzodiazepin-2-one
5-(p-nitrophenyl)-7-nitro-1,3-dihydro-2H-1,4-benzodiazepin-2-one
5-(p-nitrophenyl)-7-trifluoromethyl-1,3-dihydro-2H-1,4-benzodiazepin-2-one
5-(o-trifluoromethyl-phenyl)-1,3-dihydro-2H-1,4-benzodiazepin-2-one
5-(m-trifluoromethyl-phenyl)-1,3-dihydro-2H-1,4-benzodiazepin-2-one 5-(p-trifluoromethyl-phenyl)-1,3-dihydro-2H-1,4-benzodiazepin-2-one
5-(o-trifluoromethyl-phenyl)-7-chloro-1,3-dihydro-2H-1,4-benzodiazepin-2-one
5-(o-trifluoromethyl-phenyl)-7-nitro-1,3-dihydro-2H-1,4-benzodiazepin-2-one
5-(o-trifluoromethyl-phenyl)-7-trifluoromethyl-1,3-dihydro-2H-1,4-benzodiazepin-2-one
1-methyl-5-(o-nitrophenyl)-1,3-dihydro-2H-1,4-benzodiazepin-2-one
1-methyl-5-(o-nitrophenyl)-7-chloro-1,3-dihydro-2H-1,4-benzodiazepin-2-one
1-methyl-5-(o-nitrophenyl)-7-nitro-1,3-dihydro-2H-1,4-benzodiazepin-2-one
1-methyl-5-(o-nitrophenyl)-7-trifluoromethyl-1,3-dihydro-2H-1,4-benzodiazepin-2-one
1-methyl-5-(p-nitrophenyl)-7-nitro-1,3-dihydro-2H-1,4-benzodiazepin-2-one
1-methyl-5-(o-trifluoromethyl-phenyl)-1,3-dihydro-2H-1,4-benzodiazepin-2-one
1-methyl-5-(o-trifluoromethyl-phenyl)-7-chloro-1,3-dihydro-2H-1,4-benzodiazepin-2-one
1-methyl-5-(o-trifluoromethyl-phenyl)-7-nitro-1,3-dihydro-2H-1,4-benzodiazepin-2-one
1-methyl-5-(o-trifluoromethyl-phenyl)-7-trifluoromethyl-1,3-dihydro-2H-1,4-benzodiazepin-2-one
1-methyl-5-(p-trifluoromethyl-phenyl)-7-chloro-1,3-dihydro-2H-1,4-benzodiazepin-2-one
1-cyclopropylmethyl-5-phenyl-1,3-dihydro-2H-1,4-benzodiazepin-2-one
1-cyclopropylmethyl-5-phenyl-6-chloro-1,3-dihydro-2H-1,4-benzodiazepin-2-one
1-cyclopropylmethyl-5-phenyl-7-chloro-1,3-dihydro-2H-1,4-benzodiazepin-2-one
1-cyclopentylmethyl-5-phenyl-7-chloro-1,3-dihydro-2H-1,4-benzodiazepin-2-one
1-cyclopropylmethyl-5-phenyl-8-chloro-1,3-dihydro-2H-1,4-benzodiazepin-2-one
1-cyclopropylmethyl-5-phenyl-9-chloro-1,3-dihydro-2H-1,4-benzodiazepin-2-one
1-cyclopropylmethyl-5-phenyl-7-bromo-1,3-dihyro-2H-1,4-benzodiazepin-2-one
1-cyclobutylmethyl-5-phenyl-7-chloro-1,3-dihydro-2H-1,4-benzodiazepin-2-one
1-cyclopentylmethyl-5-phenyl-7-bromo-1,3-dihydro-2H-1,4-benzodiazepin-2-one
1-cyclohexylmethyl-5-phenyl-7-chloro-1,3-dihydro-2H-1,4-benzodiazepin-2-one
1-cyclopropylmethyl-5-(o-fluorophenyl)-1,3-dihydro-2H-1,4-benzodiazepin-2-one
1-cyclopropylmethyl-5-(o-chlorophenyl)-1,3-dihydro-2H-1,4-benzodiazepin-2-one
1-cyclopropylmethyl-5-(o-fluorophenyl)-7-chloro-1,3-dihydro-2H-1,4-benzodiazepin-2-one
1-cyclopentylmethyl-5-(o-fluorophenyl)-7-chloro-1,3-dihydro-2H-1,4-benzodiazepin-2-one
1-cyclopropylmethyl-5-(o-chlorophenyl)-7-chloro-1,3-dihydro-2H-1,4-benzodiazepin-2-one
1-cyclopropylmethyl-5-(o-fluorophenyl)-9-chloro-1,3-dihydro-2H-1,4-benzodiazepin-2-one
1-cyclopropylmethyl-5-(o-fluorophenyl)-7-bromo-1,3-dihydro-2H-1,4-benzodiazepin-2-one
1-cyclobutylmethyl-5-(o-fluorophenyl)-7-chloro-1,3-dihydro-2H-1,4-benzodiazepin-2-one
1-cyclopentylmethyl-5-(o-fluorophenyl)-7-bromo-1,3-dihydro-2H-1,4-benzodiazepin-2-one
1-cyclohexylmethyl-5-(o-fluorophenyl)-7-chloro-1,3-dihydro-2H-1,4-benzodiazepin-2-one
3-methyl-5-phenyl-1,3-dihydro-2H-1,4-benzodiazepin-2-one
7-chloro-3-methyl-5-phenyl-1,3-dihydro-2H-1,4-benzodiazepin-2-one
7-bromo-3-methyl-5-phenyl-1,3-dihydro-2H-1,4-benzodiazepin-2-one
8 (or 6)-chloro-3-methyl-5-phenyl-1,3-dihydro-2H-1,4-benzodiazepin-2-one
9-chloro-3-methyl-5-phenyl-1,3-dihydro-2H-1,4-benzodiazepin-2-one
7-methoxy-3-methyl-5-phenyl-1,3-dihydro-2H-1,4-benzodiazepin-2-one
7-chloro-5-(o-chlorophenyl)-3-methyl-1,3-dihydro-2H-1,4-benzodiazepin-2-one
7-chloro-5-(o-fluorophenyl)-3-methyl-1,3-dihydro-2H-1,4-benzodiazepin-2-one
7-chloro-5-(p-chlorophenyl)-3-methyl-1,3-dihydro-2H-1,4-benzodiazepin-2-one
7-chloro-5-(p-bromophenyl)-1,3-dimethyl-1,3-dihydro-2H-1,4-benzodiazepin-2-one
7-chloro-3-ethyl-5-phenyl-1,3-dihydro-2H-1,4-benzodiazepin-2-one
7-chloro-5-phenyl-3-propyl-1,3-dihydro-2H-1,4-benzodiazepin-2-one
3-benzyl-7-chloro-5-phenyl-1,3-dihydro-2H-1,4-benzodiazepin-2-one
7-chloro-3,4-diphenyl-1,3-dihydro-2H-1,4-benzodiazepin-2-one
7-chloro-1,3-dimethyl-5-phenyl-1,3-dihydro-2H-1,4-benzodiazepin-2-one
7-chloro-1-($\beta$-chloroethyl)-3-methyl-5-phenyl-1,3-dihydro-2H-1,4-benzodiazepin-2-one
7-chloro-1-($\gamma$-chloropropyl)-3-methyl-5-phenyl-1,3-dihydro-2H-1,4-benzodiazepin-2-one
7-chloro-3-methyl-5-phenyl-1-(2',2',2'-trifluoroethyl)-1,3-dihydro-2H-1,4-benzodiazepin-2-one
1-allyl-7-chloro-3-methyl-5-phenyl-1,3-dihydro-2H-1,4-benzodiazepin-2-one
7-chloro-1-cyclopropylmethyl-3-methyl-5-phenyl-1,3-dihydro-2H-1,4-benzodiazepin-2-one
7-chloro-1-cyclopentylmethyl-3-methyl-5-phenyl-1,3-dihydro-2H-1,4-benzodiazepin-2-one
1,3,7-trimethyl-5-phenyl-1,3-dihydro-1,3-dihydro-2H-1,4-benzodiazepin-2-one
7-chloro-5-(o-chlorophenyl)-1,3-dimethyl-1,3-dihydro-2H-1,4-benzodiazepin-2-one
7-chloro-5-(o-fluorophenyl)-1,3-dimethyl-1,3-dihydro-2H-1,4-benzodiazepin-2-one
7-chloro-1,3-dimethyl-5-(p-tolyl)-1,3-dihydro-2H-1,4-benzodiazepin-2-one
7-chloro-1,3-dimethyl-5-(p-methoxy-phenyl)-1,3-dihydro-2H-1,4-benzodiazepin-2-one
7-chloro-1-ethyl-3-methyl-5-phenyl-1,3-dihydro-2H-1,4-benzodiazepin-2-one
7-chloro-5-phenyl-1-(trifluoromethyl)-1,3-dihydro-2H-1,4-benzodiazepin-2-one
5-phenyl-1-(trifluoromethyl)-1,3-dihydro-2H-1,4-benzodiazepin-2-one
7-chloro-5-phenyl-1-(2',2',2'-trifluoroethyl)-1,3-dihydro-2H-1,4-benzodiazepin-2-one
5-phenyl-1-(2',2',2'-trifluoroethyl)-1,3-dihydro-2H-1,4-benzodiazepin-2-one
7-nitro-5-phenyl-1-(2',2',2'-trifluoroethyl)-1,3-dihydro-2H-1,4-benzodiazepin-2-one
7-chloro-5-(o-chlorophenyl)-1-(2',2',2'-trifluoroethyl)-1,3-dihydro-2H-1,4-benzodiazepin-2-one
7-chloro-5-(o-fluorophenyl)-1-(2',2',2'-trifluoroethyl)-1,3-dihydro-2H-1,4-benzodiazepin-2-one
7-chloro-5-(p-nitrophenyl)-1-(2',2',2'-trifluoroethyl)-1,3-dihydro-2H-1,4-benzodiazepin-2-one
7-chloro-5-(o-tolyl)-1-(2',2',2'-trifluoroethyl)-1,3-dihydro-2H-1,4-benzodiazepin-2-one
7-nitro-5-(o-nitrophenyl)-1-(2',2',2'-trifluoroethyl)-1,3-dihydro-2H-1,4-benzodiazepin-2-one
7-chloro-5-(o-trifluoromethylphenyl)-1-(2',2',2'-trifluoroethyl)-1,3-dihydro-2H-1,4-benzodiazepin-2-one
7-chloro-5-(p-methoxyphenyl)-1-(2',2',2'-trifluoroethyl)-1,3-dihydro-2H-1,4-benzodiazepin-2-one
7-chloro-5-phenyl-1-(2'-chloroethyl)-1,3-dihydro-2H-1,4-benzodiazepin-2-one 7-chloro-5-phenyl-1-(3'-chloropropyl)-1,3-dihydro-2H-1,4-benzodiazepin-2-one
7-chloro-5-phenyl-1-(methoxyethyl)-1,3-dihydro-2H-1,4-benzodiazepin-2-one
7-chloro-5-phenyl-1-(ethoxyethyl)-1,3-dihydro-2H-1,4-benzodiazepin-2-one
5-phenyl-1-,methoxymethyl)-1,3-dihydro-2H-1,4-benzodiazepin-2-one
5-phenyl-1-(ethoxymethyl)-1,3-dihydro-2H-1,4-benzodiazepin-2-one
7-chloro-5-phenyl-1-(methoxypropyl)-1,3-dihydro-2H-1,4-benzodiazepin-2-one
5-phenyl-1-(methoxypropyl)-1,3-dihydro-2H-1,4-benzodiazepin-2-one
1-(2'-dimethylaminoethyl)-5-phenyl-1,3-dihydro-2H-1,3-benzodiazepin-2-one
1-(2'-dimethylaminoethyl)-5-phenyl-7-chloro-1,3-dihydro-2H-1,4-benzodiazepin-2-one
1-(2'-dimethylaminoethyl)-5-phenyl-7-bromo-1,3-dihydro-2H-1,4-benzodiazepin-2-one
1-(2'-dimethylaminoethyl)-5-phenyl-7-fluoro-1,3-dihydro-2H-1,4-benzodiazepin-2-one
1-(2'-dimethylaminoethyl)-5-phenyl-9-chloro-1,3-dihydro-2H-1,4-benzodiazepin-2-one
1-(2'-dimethylaminoethyl)-5-phenyl-7-nitro-1,3-dihydro-2H-1,4-benzodiazepin-2-one
1-(2'-dimethylaminoethyl)-5-phenyl-7-trifluoromethyl-1,3-dihydro-2H-1,4-benzodiazepin-2-one
1-(2'-dimethylaminoethyl)-5-(o-fluorophenyl)-7-chloro-1,3-dihydro-2H-1,4-benzodiazepin-2-one
1-(2'-dimethylaminoethyl)-5-(o-fluorophenyl)-1,3-dihydro-2H-1,4-benzodiazepin-2-one
1-(2'-dimethylaminoethyl)-5-(o-chlorophenyl)-7-chloro-1,3-dihydro-2H-1,4-benzodiazepin-2-one
1-(2'-dimethylaminoethyl)-5-(m-nitrophenyl)-7-chloro-1,3-dihydro-2H-1,4-benzodiazepin-2-one
1-(2'-dimethylaminoethyl)-5-(p-chlorophenyl)-7-chloro-1,3-dihydro-2H-1,4-benzodiazepin-2-one
1-(2'-dimethylaminoethyl)-5-(p-bromophenyl)-7-chloro-1,3-dihydro-2H-1,4-benzodiazepin-2-one
1-(2'-diethylaminoethyl)-5-(o-fluorophenyl)-7-bromo-1,3-dihydro-2H-1,4-benzodiazepin-2-one
1-(2'-diethylaminoethyl)-5-phenyl-7-methyl-1,3-dihydro-2H-1,4-benzodiazepin-2-one
1-(2'-diethylaminoethyl)-5-phenyl-7-methoxy-1,3-dihydro-2H-1,4-benzodiazepin-2-one
1-(3'-methylaminopropyl)-5-(o-fluorophenyl)-7-chloro-1,3-dihydro-2H-1,4-benzodiazepin-2-one
1-(3'-dimethylaminopropyl)-5-phenyl-7-chloro-1,3-dihydro-2H-1,4-benzodiazepin-2-one
1-(3'-dimethylaminopropyl)-5-phenyl-1,3-dihydro-2H-1,4-benzodiazepin-2-one
1-(3'-dimethylaminopropyl)-5-phenyl-7-nitro-1,3-dihydro-2H-1,4-benzodiazepin-2-one
1-(3'-dimethylaminopropyl)-5-(o-fluorophenyl)-7-chloro-1,3-dihydro-2H-1,4-benzodiazepin-2-one
1-(3'-diethylaminopropyl)-5-(o-fluorophenyl)-7-chloro-1,3-dihydro-2H-1,4-benzodiazepin-2-one
1-(2'-dimethylamino-1'-methylethyl)-5-phenyl-7-chloro-1,3-dihydro-2H-1,4-benzodiazepin-2-one
1-(2'-pyrrolidinoethyl)-5-phenyl-7-chloro-1,3-dihydro-2H-1,4-benzodiazepin-2-one
1-(2'-piperidinoethyl)-5-phenyl-7-chloro-1,3-dihydro-2H-1,4-benzodiazepin-2-one
1-(2'-morpholinoethyl)-5-phenyl-7-chloro-1,3-dihydro-2H-1,4-benzodiazepin-2-one
1-(2'-diethylaminoethyl)-5-(o-nitrophenyl)-7-chloro-1,3-dihydro-2H-1,4-benzodiazepin-2-one
1-(2'-diethylaminoethyl)-5-(p-tolyl)-7-chloro-1,3-dihydro-2H-1,4-benzodiazepin-2-one
1-(2'-piperidinoethyl)-5-phenyl-7-chloro-1,3-dihydro-2H-1,4-benzodiazepin-2-one
1-[2'-(4''-methyl-1''-piperazinyl)ethyl]-5-phenyl-7-chloro-1,3-dihydro-2H-1,4-benzodiazepin-2-one
1-[2'-(4''-methyl-1''-piperazinyl)ethyl]-5-(o-fluorophenyl)-7-chloro-1,3-dihydro-2H-1,4-benzodiazepin-2-one
1-(3'-piperazinopropyl)-5-(o-fluorophenyl)-7-chloro-1,3-dihydro-2H-1,4-benzodiazepin-2-one
1-[3'-(4''-methyl-1''-piperazinyl)propyl]-5-phenyl-7-chloro-1,3-dihydro-2H-1,4-benzodiazepin-2-one
1-[3'-(4''-methyl-1''-piperazinyl)propyl]-5-(o-fluorophenyl)-7-chloro-1,3-dihydro-2H-1,4-benzodiazepin-2-one
1-[3'-(4''-[2''-ethoxyethyl]-1''-piperazinyl)-propyl]-5-(o-fluorophenyl)-7-chloro-1,3-dihydro-2H-1,4-benzodiazepin-2-one
7-chloro-1-(N,N-diethylcarbamoylmethyl)-5-phenyl-1,3-dihydro-2H-1,4-benzodiazepin-2-one
7-chloro-1-(N,N-dimethylcarbamoylmethyl)-5-phenyl-1,3-dihydro-2H-1,4-benzodiazepin-2-one
7-chloro-1-(N-methylcarbamoylmethyl)-5-(o-fluorophenyl)-1,3-dihydro-2H-1,4-benzodiazepin-2-one
1-(N-methylcarbamoylmethyl)-5-phenyl-7-(2',2',2'-trifluoroethyl)-1,3-dihydro-2H-1,4-benzodiazepin-2-one
1-(N-methylcarbamoylmethyl)-5-phenyl-1,3-dihydro-2H-1,4-benzodiazepin-2-one
7-chloro-1-(N-ethylcarbamoylmethyl)-5-phenyl-1,3-dihydro-2H-1,4-benzodiazepin-2-one
7-chloro-1-(N-methylcarbamoylmethyl)-5-phenyl-1,3-dihydro-2H-1,4-benzodiazepin-2-one
1-carbamoylmethyl-7-chloro-5-phenyl-1,3-dihydro-2H-1,4-benzodiazepin-2-one
1-(2'-carbamoylethyl)-7-chloro-5-phenyl-1,3-dihydro-2H-1,4-benzodiazepin-2-one
7-chloro-1-(β-N-methylcarbamoylethyl)-5-phenyl-1,3-dihydro-2H-1,4-benzodiazepin-2-one
1-(N-dimethylcarbamoylmethyl)-7-nitro-5-phenyl-1,3-dihydro-2H-1,4-benzodiazepin-2-one
1-(N-methylcarbamoylmethyl)-7-nitro-5-phenyl-1,3-dihydro-2H-1,4-benzodiazepin-2-one
7-chloro-5-(o-chlorophenyl)-1-(6-methylcarbamoylmethyl)-1,3-dihydro-2H-1,4-benzodiazepin-2-one
1-(N-methylcarbamoylmethyl)-5-phenyl-7-trifluoromethyl-1,3-dihydro-2H-1,4-benzodiazepin-2-one
1-phenyl-5-methyl-7-chloro-1,3-dihydro-2H-1,4-benzodiazepin-2-one
1-phenyl-5-methyl-1,3-dihydro-2H-1,4-benzodiazepin-2-one
1-phenyl-5-ethyl-7-chloro-1,3-dihydro-2H-1,4-benzodiazepin-2-one
1-phenyl-5-propyl-7-chloro-1,3-dihydro-2H-1,4-benzodiazepin-2-one
1-(o-fluorophenyl)-5-methyl-7-chloro-1,3-dihydro-2H-1,4-benzodiazepin-2-one
1-(p-chlorophenyl)-5-methyl-7-chloro-1,3-dihydro-2H-1,4-benzodiazepin-2-one
1,5-dimethyl-7-chloro-1,3-dihydro-2H-1,4-benzodiazepin-2-one
1,5-dimethyl-7-methoxy-1,3-dihydro-2H-1,4-benzodiazepin-2-one
1,5,7-trimethyl-1,3-dihydro-2H-1,4-benzodiazepin-2-one
1,5-dimethyl-7-trifluoromethyl-1,3-dihydro-2H-1,4-benzodiazepin-2-one
1-methyl-5-ethyl-7-chloro-1,3-dihydro-2H-1,4-benzodiazepin-2-one
1-methyl-5-n-propyl-7-chloro-1,3-dihydro-2H-1,4-benzodiazepin-2-one
1-methyl-5-isopropyl-7-chloro-1,3-dihydro-2H-1,4-benzodiazepin-2-one
5-benzyl-7-chloro-1,3-dihydro-2H-1,4-benzodiazepin-2-one
1-ethyl-5-benzyl-7-chloro-1,3-dihydro-2H-1,4-benzodiazepin-2-one
1-propyl-5-benzyl-7-chloro-1,3-dihydro-2H-1,4-benzodiazepin-2-one
1-methyl-5-benzyl7-bromo-1,3-dihydro-2H-1,4-benzodiazepin-2-one 1-cyclopropylmethyl-5-benzyl-7-chloro-1,3-dihydro-2H-1,4-benzodiazepin-2-one
1-(3'-chlorophenyl)-5-(2''-fluorophenyl)-7-chloro-1,3-dihydro-2H-1,4-benzodiazepin-2-one
1-benzyl-5-phenyl-7-chloro-1,3-dihydro-2H-1,4-benzodiazepin-2-one
1-(4'-chlorophenyl)-5-phenyl-7-chloro-1,3-dihydro-2H-1,4-benzodiazepin-2-one
1,5-diphenyl-1,3-dihydro-2H-1,4-benzodiazepin-2-one
1-(3'-chlorophenyl)-5-phenyl-7-chloro-1,3-dihydro-2H-1,4-benzodiazepin-2-one
1-(o-chlorobenzyl)-5-phenyl-7-chloro-1,3-dihydro-2H-1,4-benzodiazepin-2-one
1-(o-fluorobenzyl)-5-phenyl-7-chloro-1,3-dihydro-2H-1,4-benzodiazepin-2-one
1-benzyl-5-phenyl-1,3-dihydro-2H-1,4-benzodiazepin-2-one
5-cyclopentyl-1,3-dihydro-2H-1,4-benzodiazepin-2-one
5-cyclopentyl-7-chloro-1,3-dihydro-2H-1,4-benzodiazepin-2-one
5-cyclohexyl-1,3-dihydro-2H-1,4-benzodiazepin-2-one
5-cyclohexyl-7-chloro-1,3-dihydro-2H-1,4-benzodiazepin-2-one
5-cyclohexyl-7-nitro-1,3-dihydro-2H-1,4-benzodiazepin-2-one
5-cyclohexyl-7-methyl-1,3-dihydro-2H-1,4-benzodiazepin-2-one
5-cyclohexyl-7-methoxy-1,3-dihydro-2H-1,4-benzodiazepin-2-one
5-cyclohexyl-7-methylsulfonyl-1,3-dihydro-2H-1,4-benzodiazepin-2-one
1-methyl-5-cyclohexyl-7-chloro-1,3-dihydro-2H-1,4-benzodiazepin-2-one
3-methyl-5-cyclohexyl-7-chloro-1,3-dihydro-2H-1,4-benzodiazepin-2-one
5-cycloheptyl-1,3-dihydro-2H-1,4-benzodiazepin-2-one
5-cycloheptyl-7-chloro-1,3-dihydro-2H-1,4-benzodiazepin-2-one
5-(2'-pyridyl)-1,3-dihydro-2H-1,4-benzodiazepin-2-one
5-(2'-pyridyl)-7-chloro-1,3-dihydro-2H-1,4-benzodiazepin-2-one
5-(2'-pyridyl)-1-methyl-7-chloro-1,3-dihydro-2H-1,4-benzodiazepin-2-one
5-(2'-pyridyl)-7-bromo-1,3-dihydro-2H-1,4-benzodiazepin-2-one
5-(2'-pyridyl)-1-methyl-7-bromo-1,3-dihydro-2H-1,4-benzodiazepin-2-one
5-(2'-pyridyl)-3-methyl-7-bromo-1,3-dihydro-2H-1,4-benzodiazepin-2-one
5-(2'-pyridyl)-7-nitro-1,3-dihydro-2H-1,4-benzodiazepin-2-one
5-[2'-(3'-methylpyridyl)]-7-chloro-1,3-dihydro-2H-1,4-benzodiazepin-2-one
5-(2'-thienyl)-7-nitro-1,3-dihydro-2H-1,4-benzodiazepin-2-one
5-[2'-(5'-methylthienyl)]-7-chloro-1,3-dihydro-2H-1,4-benzodiazepin-2-one
5-[2'-(5'-chloro-thienyl)]-7-chloro-1,3-dihydro-2H-1,4-benzodiazepin-2-one
5-(3'-thienyl)-7-chloro-1,3-dihydro-2H-1,4-benzodiazepin-2-one
5-(2'-furyl)-7-chloro-1,3-dihydro-2H-1,4-benzodiazepin-2-one
5-[2'-(3'-methyl-furyl)]-7-chloro-1,3-dihydro-2H-1,4-benzodiazepin-2-one
5-[2'-chloro-furyl)]-7-chloro-1,3-dihydro-2H-1,4-benzodiazepin-2-one
5-(2'-pyridyl)-8-chloro-1,3-dihydro-2H-1,4-benzodiazepin-2-one
5-(2'-pyrimidyl)-7-chloro-1,3-dihydro-2H-1,4-benzodiazepin-2-one
5-[2'-(4'-methyl-pyridyl)]-7-chloro-1,3-dihydro-2H-1,4-benzodiazepin-2-one
5-[2'-(4',6'-dichloro-pyridyl)]-7-chloro-1,3-dihydro-2H-1,4-benzodiazepin-2-one
5-(3'-pyridyl)-7-chloro-1,3-dihydro-2H-1,4-benzodiazepin-2-one
5-[4'-(2'-methyl-pyridyl)-7-bromo-1,3-dihydro-2H-1,4-benzodiazepin-2-one
5-[4'-(2'-chloro-pyridyl)]-7-chloro-1,3-dihydro-2H-1,4-benzodiazepin-2-one
5-(2'-thienyl)-1,3-dihydro-2H-1,4-benzodiazepin-2-one
1-methyl-5-(2'-thienyl)-1,3-dihydro-2H-1,4-benzodiazepin-2-one
5-(2'-thienyl)-7-chloro-1,3-dihydro-2H-1,4-benzodiazepin-2-one
1-methyl-5-(2'-pyridyl)-1,3-dihydro-2H-1,4-benzodiazepin-2-one
1-methyl-5-(2'-pyridyl)-7-chloro-1,3-dihydro-2H-1,4-benzodiazepin-2-one
1-methyl-5-(2'-pyridyl)-7-nitro-1,3-dihydro-2H-1,4-benzodiazepin-2-one.

The present invention is illustrated in more detail by the following examples which are not to be construed to restrict the scope of the invention.

EXAMPLE 1

To a solution of 0.2 g. of 2-methylamino-5-chlorobenzophenone in 20 ml. of dry methylene chloride is added 0.2 g. of oxazolid-2,5-dione. To the mixture is added 20 ml. of ethereal hydrogen chloride under cooling. The mixture is allowed to stand at room temperature with occasional stirring. The reaction mixture is poured into water, basified with aqueous ammonia and extracted with methylene chlorid. The extracts are combined and dried over sodium sulfate, and the solvent is removed under reduced pressure. The residue is crystallized from isopropyl alcohol to give 1-methyl-5-phenyl-7-chloro-1,3-dihydro-2H-1,4-benzodiazepin-2-one. Recrystallization from isopropyl alcohol gives 0.22 g. of prisms having a melting point of 129°–131° C. Yield 90%.

EXAMPLE 2

Using the procedure similar to that in Example 1, but replacing 2-methylamino-5-chlorobenzophenone by 2-($\beta,\beta,\beta$-trifluoroethyl)amino - 5 - chlorobenzophenone, there is obtained 1-($\beta,\beta,\beta$-trifluoroethyl) - 5 - phenyl-7-chloro-1,3-dihydro-2H-1,4-benzodiazepin-2-one, M.P. 164°–166° C.

EXAMPLE 3

Using the procedure similar to that in Example 1, but replacing 2 - methylamino - 5 - chlorobenzophenone by 2-methylamino-5-chloro - 2' - fluorobenzophenone, there is obtained 1-methyl-5-(o-fluorophenyl)-7-chloro-1,3-dihydro-2H-1,4-benzodiazepin-2-one.

This material is treated with ethanolic hydrogen chloride to give the hydrochloride in a quantitative yield. Recrystallization from ethanol gives crystals decomposed at 218.5°–219° C.

EXAMPLE 4

Using the procedure similar to that in Example 1, but replacing 2 - methylamino - 5 - chlorobenzophenone by 2-methylamino-5,2'-dichloro - benzophenone, there is obtained 1-methyl-5-(o-chlorophenyl) - 7 - chloro - 1,3 - dihydro-2H-1,4-benzodiazepin-2-one, M.P. 136°–138° C.

EXAMPLE 5

Using the procedure similar to that in Example 1, but replacing 2 - methylamino - 5 - chlorobenzophenone by 2-methylamino - 5,4' - dichlorobenzophenone, there is obtained 1-methyl-5-(p-chlorophenyl) - 7 - chloro - 1,3 - dihydro-2H-1,4-benzodiazepin-2-one, M.P. 154°–156° C.

EXAMPLE 6

Using the procedure similar to that in Example 1, but replacing oxazolid-2,5-dione by thiazolid-2,5-dione, there is obtained 1-methyl-5-phenyl-7-chloro-1,3-dihydro - 2H-1,4-benzodiazepin-2-one, M.P. 129°–131° C.

EXAMPLE 7

To a solution of 0.2 g. of 2-methylamino-5-nitrobenzophenone in 20 ml. of dry methylene chloride, is added 0.2 g. of oxazolid-2,5-dione. To the mixture is added dropwise 10 ml. of ethereal hydrogen chloride under cooling. The mixture is stirred at room temperature. The reaction mixture is poured into water, made alkaline with aqueous ammonia and extracted with methylene chloride. The methylene chloride extracts are combined and dried over sodium sulfate, and the solvent is removed under reduced pressure. The residue is recrystallized from ethanol to give 1 - methyl-5-phenyl-7-nitro-1,3-dihydro - 2H - 1,4-benzodiazepin-2-one, M.P. 157°–159° C.

EXAMPLE 8

Using the procedure similar to that in Example 7, but replacing 2-methylamino-5-nitrobenzophenone by 2-methylamino-2'-fluoro-5-nitrobenzophenone, there is obtained 1-methyl-5-(o-fluorophenyl)-7-nitro-1,3-dihydro - 2H - 1,4-benzodiazepin-2-one, M.P. 170°–172° C.

EXAMPLE 9

To a solution of 0.2 g. of 2-amino - 5 - chlorobenzophenone in 15 ml. of dry methylene chloride is added 0.15 g. of oxazolid-2,5-dione. To the mixture is added 5 ml. of ethereal hydrogen chloride under cooling. The mixture is allowed to stand at room temperature with stirring. The reaction mixture is poured into water, basified with aqueous ammonia and extracted with methylene chloride. The methylene chloride extracts are combined, dried over sodium sulfate and concentrated. The residue is dissolved in 4 ml. of dimethyl sulfoxide and the solution is heated at 50°–60° C. and concentrated under reduced pressure. The residue is crystallized from methanol and recrystallized from methanol to give 0.22 g. (91.9%) of 5-phenyl-7-chloro-1,3-dihydro-2H-1,4-benzodiazepin-2-one, M.P. 213°–215° C.

EXAMPLE 10

Using the procedure similar to that in Example 9, but replacing 2-amino-5-chlorobenzophenone by 2-amino-5-bromo-benzophenone, there is obtained 5-phenyl-7-bromo-1,3 - dihydro-2H-1,4-benzodiazepin-2-one. Recrystallization from acetone gives crystals, M.P. 220°–221° C.

EXAMPLE 11

Using the procedure similar to that in Example 9, but replacing 2-amino-5-chlorobenzophenone by 2-amino-5-trifluoromethyl-benzophenone, there is obtained 5-phenyl-7-trifluoromethyl-1,3-dihydro - 2H - 1,4 - benzodiazepin-2-one. Recrystallization from benzene-hexane mixture gives crystals, M.P. 204°–205° C.

EXAMPLE 12

Using the procedure similar to that in Example 9, but replacing 2-amino-5-chlorobenzophenone by 2-aminobenzophenone, there is obtained 5-phenyl-1,3-dihydro-2H-1,4-benzodiazepin-2-one. Recrystallization from acetone gives crystals, M.P. 180°–181° C.

EXAMPLE 13

Using the procedure similar to that in Example 9, but replacing 2-amino-5-chlorobenzophenone by 2-amino-5-chloro-2'-fluorobenzophenone, there is obtained 5-(o-fluorophenyl) - 7 - chloro-1,3-dihydro-2H-1,4-benzodiazepin-2-one. Recrystallization from isopropyl alcohol gives crystals, M.P. 203°–205° C., yield: 93%.

EXAMPLE 14

Using the procedure similar to that in Example 9, but replacing 2-amino-5-chlorobenzophenone by 2-amino-5,2'-dichlorobenzophenone, there is obtained 5-(o-chlorophenyl)-7-chloro - 1,3 - dihydro - 2H-1,4-benzodiazepin-2-one. Recrystallization from ethanol gives crystals having a melting point of 199°–201° C., in a yield of 82.6%.

EXAMPLE 15

Using the procedure similar to that in Example 9, but replacing 2-amino-5-chlorobenzophenone by 2-amino-5,4'-dichlorobenzophenone, there is obtained 5-(p-chlorophenyl) - 7 - chloro - 1,3-dihydro-2H-1,4-benzodiazepin-2-one. Recrystallization from ethanol gives crystals, M.P. 246°–247° C.

EXAMPLE 16

Using the procedure similar to that in Example 9, but replacing oxazolid-2,5-dione by 4-methyl-oxazolid-2,5-dione, there is obtained 3-methyl-5-phenyl-7-chloro-1,3-dihydro-2H-1,4-benzodiazepin-2-one. Recrystallization from benzene-petroleum ether gives crystals, M.P. 219°–221° C.

EXAMPLE 17

To a solution of 0.2 g. of 2-amino-5-nitrobenzophenone in 15 ml. of dry methylene chloride is added 0.2 g. of oxazolid-2,5-dione. To the mixture is added 10 ml. of ethereal hydrogen chloride under ice-cooling. The mixture is allowed to stand at room temperature with stirring. The reaction mixture is poured into water, basified with aqueous ammonia and extracted with methylene chloride. The methylene chloride extracts are combined and dried over sodium sulfate, and the solvent is removed. The residue is dissolved in 10 ml. of dimethyl sulfoxide and the solution is heated at 50°–60° C. and concentrated under reduced pressure. The residue is crystallized from ethanol and recrystallized from ethanol to give 0.2 g. (88%) of 5-phenyl-7-nitro-1,3-dihydro-2H-1,4-benzodiazepin-2-one, M.P. 223°–225° C.

EXAMPLE 18

Using the procedure similar to that in Example 17, but replacing 2-amino-5-nitrobenzophenone by 2-amino-2'-fluoro-5-nitrobenzophenone, there is obtained 5-(o-fluorophenyl) - 7 - nitro - 1,3 - dihydro-2H-1,4-benzodiazepin-2-one, M.P. 223°–225° C.

EXAMPLE 19

Using the procedure similar to that in Example 17, but replacing 2-amino-5-nitrobenzophenone by 2-amino-2'-chloro-5-nitrobenzophenone, there is obtained 5-(o-chlorophenyl)-7-nitro - 1,3 - dihydro-2H-1,4-benzodiazepin-2-one, M.P. 236.5°–238° C.

EXAMPLE 20

Using the procedure similar to that in Example 17, but replacing 2-amino-5-nitrobenzophenone by 2-amino-2'-trifluoromethyl-5-nitrobenzophenone, there is obtained 5-(o-trifluoromethylphenyl)-7-nitro - 1,3 - dihydro-2H-1,4-benzodiazepin-2-one, M.P. 233°–234° C.

EXAMPLE 21

To a solution of 2 g. of 2-amino-5-chloro-2'-methylbenzophenone in 100 ml. of dry methylene chloride is added 2 g. of oxazolid-2,5-dione. To the mixture is added dropwise 20 ml. of ethereal hydrogen chloride below 50° C. under ice-cooling with stirring. The mixture is stirred at room temperature. The reaction mixture is poured into ice-water, basified with aqueous ammonia and extracted with methylene chloride. The methylene chloride extracts are combined and dried over sodium sulfate, and the solvent is removed. The residue is heated with 30 ml. of dimethylsulfoxide at 65°–70° C., and the solvent is removed under reduced pressure. The residue is dissolved in methylene chloride, washed with water and dried over sodium sulfate, and the solvent is removed. The residue, which is solidified on standing, is recrystallized from isopropyl alcohol to give 2.1 g. of 5-(o-tolyl)-7-chloro-1,3-dihydro-2H-1,4-benzodiazepin-2-one, M.P. 179°–180° C., yield 90.5%.

EXAMPLE 22

Using the procedure similar to that in Example 21, but replacing 2 - amino-5-chloro-2'-methylbenzophenone but 2-methylamino-5-chloro-2'-methylbenzophenone, there is obtained 1 - methyl-5-(o-tolyl)-7-chloro-1,3-dihydro-2H-1,4-benzodiazepin-2-one. Recrystallization from isopropyl alcohol gives crystals, M.P. 138°–139° C.

EXAMPLE 23

In a manner similar to that described in Examples 1 through 22, the following compounds are prepared.

5-phenyl-6-chloro-1,3-dihydro-2H-1,4-benzodiazepin-2-one, M.P. 243°–245° C.
5-phenyl-8-chloro-1,3-dihydro-2H-1,4-benzodiazepin-one, M.P. 214°–215° C.
5-phenyl-9-chloro-1,3-dihydro-2H-1,4-benzodiazepin-2-one, M.P. 174°–176° C.
5-phenyl-8-nitro-1,3-dihydro-2H-1,4-benzodiazepin-2-one, M.P. 252° C. (decomp.)
5-phenyl-9-nitro-1,3-dihydro-2H-1,4-benzodiazepin-2-one, M.P. 146°–147° C.
7-methyl-5-phenyl-1,3-dihydro-2H-1,4-benzodiazepin-2-one, M.P. 209°–210° C.
7-methoxy-5-phenyl-1,3-dihydro-2H-1,4-benzodiazepin-2-one, M.P. 216°–218° C.
8-methoxy-5-phenyl-1,3-dihydro-2H-1,4-benzodiazepin-2-one, M.P. 186°–188° C.
8-methoxy-7-bromo-5-phenyl-1,3-dihydro-2H-1,4-benzodiazepin-2-one, M.P. 260°–261° C.
8-trifluoromethyl-5-phenyl-1,3-dihydro-2H-1,4-benzodiazepin-2-one, M.P. 216°–218° C.
7-methylsulfonyl-5-phenyl-1,3-dihydro-2H-1,4-benzodiazepin-2-one, M.P. 256°–258° C.
7-methylsulfinyl-5-phenyl-1,3-dihydro-2H-1,4-benzodiazepin-2-one, M.P. 254° C. (decomp.)
7-cyano-5-phenyl-1,3-dihydro-2H-1,4-benzodiazepin-2-one, M.P. 238° C. (decomp.)
7-dimethylamino-5-phenyl-1,3-dihydro-2H-1,4-benzodiazepin-2-one, M.P. 245°–247° C.
7-piperidino-5-phenyl-1,3-dihydro-2H-1,4-benzodiazepin-2-one, M.P. 250°–252° C.
2-(p-chlorophenyl)-7-nitro-1,3-dihydro-2H-1,4-benzodiazepin-2-one, M.P. 253°–254° C.
5-(p-chlorophenyl)-7-chloro-1,3-dihydro-2H-1,4-benzodiazepin-2-one, M.P. 262°–263° C.
5-(o-methoxyphenyl)-7-chloro-1,3-dihydro-2H-1,4-benzodiazepin-2-one, M.P. 205°–207° C.
5-(m-methoxyphenyl)-7-chloro-1,3-dihydro-2H-1,4-benzodiazepin-2-one, M.P. 220°–222° C.
5-(o-chlorophenyl)-7,8-dimethyl-1,3-dihydro-2H-1,4-benzodiazepin-2-one, M.P. 259°–260° C.
5-(o-chlorophenyl)-7-dimethylamino-1,3-dihydro-2H-1,4-benzodiazepin-2-one, M.P. 245°–248° C.
5-phenyl-7-bromo-8-methoxy-1,3-dihydro-2H-1,4-benzodiazepin-2-one, M.P. 260°–261° C.
5-(o-trifluoromethylphenyl)-7-trifluoromethyl-1,3-dihydro-2H-1,4-benzodiazepin-2-one, M.P. 226–227° C.
7,8-dimethyl-5-phenyl-1,3-dihydro-2H-1,4-benzodiazepin-2-one, M.P. 255°–256° C.
7-chloro-9-methylthio-5-phenyl-1,3-dihydro-2H-1,4-benzodiazepin-2-one, M.P. 189°–191° C.
1-methyl-5-phenyl-7-trifluoromethoxy-1,3-dihydro-2H-1,4-benzodiazepin-2-one, bisulfate, M.P. 234°–236° C.
1-methyl-5-phenyl-7-cyano-1,3-dihydro-2H-1,4-benzodiazepin-2-one, M.P. 158°–160° C.
1-[propyn-(2)-yl]-5-(o-chlorophenyl)-7-chloro-1,3-dihydro-2H-1,4-benzodiazepin-2-one, M.P. 140°–142° C.
1-methyl-5-(o-fluorophenyl)-7-bromo-1,3-dihydro-2H-1,4-benzodiazepin-2-one, M.P. 132°–3° C.
1-ethyl-5-(p-chlorophenyl)-7-chloro-1,3-dihydro-2H-1,4-benzodiazepin-2-one, M.P. 129°–130° C.
1-isopropyl-5-(o-chlorophenyl)-7-chloro-1,3-dihydro-2H-1,4-benzodiazepin-2-one, M.P. 145°–150° C.
1-ethyl-5-phenyl-7-chloro-1,3-dihydro-2H-1,4-benzodiazepin-2-one, M.P. 132°–133° C.
1-allyl-5-phenyl-7-chloro-1,3-dihydro-2H-1,4-benzodiazepin-2-one, M.P. 105°–106° C.
1-benzyl-5-phenyl-7-chloro-1,3-dihydro-2H-1,4-benzodiazepin-2-one, M.P. 105°–106° C.
5-(o-chlorophenyl)-7-dimethylamino-1-methyl-1,3-dihydro-2H-1,4-benzodiazepin-2-one, M.P. 112°–114° C.
7-dimethylamino-1-methyl-5 - (o-trifluoromethylphenyl)-1,3-dihydro-2H-1,4-benzodiazepin-2-one, M.P. 111°–114° C.
7-chloro-3-isopropyl-5-phenyl-1,3-dihydro-2H-1,4-benzodiazepin-2-one, M.P. 226°–227° C.
7-chloro-3-methoxymethyl-5-phenyl-1,3-dihydro-2H-1,4-benzodiazepin-2-one, M.P. 166°–167° C.
7-chloro-5-phenyl-3-isobutyl-1,3-dihydro-2H-1,4-benzodiazepin-2-one, M.P. 213°–214° C.
7-chloro-5-phenyl-3-β-methylthioethyl-1,3-dihydro-2H-1,4-benzodiazepin-2-one, M.P. 179°–180° C.
7-chloro-5-phenyl-3-(p-hydroxybenzyl)-1,3-dihydro-2H-1,4-benzodiazepin-2-one, M.P. 217°–218° C.
7-chloro-3-(p-methoxyphenyl)-5-phenyl-1,3-dihydro-2H-1,4-benzodiazepin-2-one, M.P. 237°–238° C.
1-methyl-7-chloro-5-phenyl-3-(p-chlorophenyl)-1,3-dihydro-2H-1,4-benzodiazepin-2-one, M.P. 200°–201° C.
7-chloro-3,5-diphenyl-1-methyl-1,3-dihydro-2H-1,4-benzodiazepin-2-one, M.P. 217°–218° C.
7-chloro-1-methyl-3-(p-methoxyphenyl) - 5-phenyl-1,3-dihydro-2H-1,4-benzodiazepin-2-one, M.P. 177°–178° C.
5-(o-nitrophenyl)-1,3-dihydro-2H-1,4-benzodiazepin-2-one, M.P. 206°–208° C.
5-(o-nitrophenyl)-7-nitro-1,3-dihydro-2H-1,4-benzodiazepin-2-one, M.P. 226°–268° C.
5-(m-sulfamoylphenyl)-7-chloro-1,3-dihydro-2H-1,4-benzodiazepin-2-one
1-methyl-5-(2',6'-dichlorophenyl)-7-chloro-1,3-dihydro-2H-1,4-benzodiazepin-2-one
1-methyl-5-(o-nitrophenyl)-7-nitro-1,3-dihydro-2H-1,4-benzodiazepin-2-one, M.P. 209°–212° C.
1-methyl-5-(3',4',5'-trimethoxyphenyl)-7-chloro-1,3-dihydro-2H-1,4-benzodiazepin-2-one, M.P. 140°–142° C.
1-methyl-5-(2'-chloro-5'-sulfamoyl-phenyl)-7-chloro-1,3-dihydro-2H-1,4-benzodiazepin-2-one
5-(2'-pyridyl)-1,3-dihydro-2H-1,4-benzodiazepin-2-one, M.P. 231°–232° C. (decomp.)
5-(2'-pyridyl-7-chloro-1,3-dihydro-2H-1,4-benzodiazepin-2-one, M.P. 224°–226° C. (decomp.)
5-(2'-pyridyl)-7-bromo-1,3-dihydro-2H-1,4-benzodiazepin-2-one, M.P. 238°–240° C.
5-(2'-pyridyl)-1-methyl-7-bromo-1,3-dihydro-2H-1,4-benzodiazepin-2-one, M.P. 135°–137° C.
5-(2'-pyridyl)-3-methyl-7-bromo-1,3-dihydro-2H-1,4-benzodiazepin-2-one, M.P. 228°–229° C. (decomp.)
5-(2'-pyridyl)-7-nitro-1,3-dihydro-2H-1,4-benzodiazepin-2-one, M.P. 253°–255° C. (decomp.)
1-methyl-5-(2'-thienyl)-1,3-dihydro-2H-1,4-benzodiazepin-2-one, M.P. 107°–109° C.
5-(2'-thienyl)-7-chloro-1,3-dihydro-2H-1,4-benzodiazepin-2-one, M.P. 212°–214° C.
1-methyl-5-(2'-pyridyl)-1,3-dihydro-2H-1,4-benzodiazepin-2-one, M.P. 199°–200° C.
5-(2'-pyrrolyl)-7-chloro-1,3-dihydro-2H-1,4-benzodiazepin-2-one, M.P. 262°–263° C.

EXAMPLE 24

To a solution of 0.2 g. of 2-amino-5-chloroacetophenone in 30 ml. of dry methylene chloride is added 0.2 g. of oxazolid-2,5-dione. To the mixture is added 10 ml. of ethereal hydrogen chloride. The mixture is allowed to stand with occasional stirring. The reaction mixture is poured into water and basified with aqueous ammonia and extracted with methylene chloride. The methylene chloride extracts are combined and dried over sodium sulfate, and the solvent is removed under reduced pressure. The residue is recrystallized from ethyl acetate to give 5-methyl-7-cholro-1,3-dihydro-2H-1,4-benzodiazepin-2-one as colorless needles, M.P. 221°–222° C.

EXAMPLE 25

Using the procedure similar to that in Example 24, but replacing 2-amino-5-chloro-acetophenone by 2-methylamino-5-chloroacetophenone, there is obtained 1,5-dimethyl-7-chloro - 1,3-dihydro-2H-1,4 - benzodiazepin-2-one, which is recrystallized from cyclohexane, M.P. 141°–143° C.

EXAMPLE 26

Using the procedure similar to that in Example 24, but replacing 2-amino-5-chloroacetophenone by (2-amino-5-chlorophenyl)-cyclohexyl-ketone, there is obtained 5-cyclohexyl-7-chloro-1,3-dihydro-2H-1,4-benzodiazepin-2-one, which is recrystallized from ethyl acetate, M.P. 210°–212° C.

Similarly, the following compounds are prepared:

1-methyl-5-ethyl-7-chloro-1,3-dihydro-2H-1,4-benzodiazepin-2-one, M.P. 97° C.
1-methyl-5-isopropyl-7-chloro-1,3-dihydro-2H-1,4-benzodiazepin-2-one, M.P. 108° C.
5-benzyl-7-chloro-1,3-dihydro-2H-1,4-benzodiazepin-2-one, M.P. 156°–159° C.
1-methyl-5-benzyl-7-chloro-1,3-dihydro-2H-1,4-benzodiazepin-2-one, hydrochloride, M.P. 214°–216° C. (decomp.)
1-cyclopropylmethyl-5-benzyl-7-chloro-1,3-dihydro-2H-1,4-benzodiazepin-2-one, M.P. 195° C. (decomp.)
5-cyclopentyl-7-chloro-1,3-dihydro-2H-1,4-benzodiazepin-2-one, M.P. 175°–176° C.
5-cyclohexyl-1,3-dihydro-2H-1,4-benzodiazepin-2-one, M.P. 199°–201° C.
5-cyclohexyl-7-chloro-1,3-dihydro-2H-1,4-benzodiazepin-2-one, M.P. 212° C.
5-cyclohexyl-7-nitro-1,3-dihydro-2H-1,4-benzodiazepin-2-one, M.P. 232°–233° C.
1-methyl-5-cyclohexyl-7-chloro-1,3-dihydro-2H-1,4-benzodiazepin-2-one, M.P. 149°–150° C.
5-cycloheptyl-1,3-dihydro-2H-1,4-benzodiazepin-2-one, M.P. 158°–160° C.
5-cycloheptyl-7-chloro-1,3-dihydro-2H-1,4-benzodiazepin-2-one, M.P. 159°–161° C.
1-methyl-5-(1'-cyclohexenyl)-7-chloro-1,3-dihydro-2H-1,4-benzodiazepin-2-one, M.P. 144° C.
1-methyl-5-(1'-cyclohexenyl)-7-nitro-1,3-dihydro-2H-1,4-benzodiazepin-2-one, M.P. 163° C.

EXAMPLE 27

To a solution of 0.1 g. of 2-cyclopropylmethylamino-5-chlorobenzophenone in 20 ml. of dry methylene chloride is added 0.1 g. of oxazolid-2,5-dione. To the mixture is added 9 ml. of ethereal hydrogen chloride, and the mixture is allowed to stand with occasional stirring. The reaction mixture is poured into water, basified with aqueous ammonia and extracted with methylene chloride. The methylene chloride extracts are combined and dried over sodium sulfate and the solvent is removed under reduced pressure. The residue is crystallized from isopropyl alcohol and recrystallized from isopropyl alcohol to give 1-cyclopropylmethyl-5-phenyl-7-chloro-1,3-dihydro-2H-1,4-benzodiazepin-2-one in a yield of 80%, M.P. 142°–144° C.

EXAMPLE 28

Using the procedure similar to that in Example 27, but replacing 2 - cyclopropylmethylamino-5-chlorobenzophenone by 2-cyclopropylmethylamino-2'-fluoro-5-chlorobenzophenone, there is obtained 1-cyclopropylmethyl-(o-fluorophenyl)-7-chloro-1,3-dihydro-2H-1,4 - benzodiazepin-2-one. This free base is treated with ethanolic hydrogen chloride and the solvent is removed. The residue is recrystallized from isopropyl alcohol-isopropyl ether to give the hydrochloride, M.P. 195° C. (decomp.).

EXAMPLE 29

Using the procedure similar to that in Example 27, but replacing 2 - cyclopropylmethylamino-5-chlorobenzophenone by 2-cyclopropylmethylamino-benzophenone, there is obtained 1-cyclopropylmethyl-5-phenyl-1,3-dihydro-2H-1,4-benzodiazepin-2-one as an oil. This free base is dissolved in ether and treated with methanolic hydrogen chloride to give the hydrochloride, M.P. 204° C. (decomp.).

EXAMPLE 30

To a solution of 0.2 g. of 2-(β-diethylaminoethylamino)-5-chloro-2'-fluorobenzophenone hydrochloride in 20 ml. of dry methylene chloride is added 0.2 g. of oxazolid-2,5-dione. To the mixture is added 9 ml. of ethereal hydrogen chloride under cooling. The mixture is allowed to stand at room temperature with occasional shaking. The reaction mixture is poured into water, basified with aqueous ammonia and extracted with methylene chloride. The methylene chloride extracts are combined and dried over sodium sulfate, and the solvent is removed under reduced pressure. The residue is treated with ethanolic hydrogen chloride to give 1-(β-diethylaminoethyl)-5-(o-fluorophenyl)-7-chloro-1,3-dihydro-2H-1,4 - benzodiazepin-2-one dihydrochloride, which is recrystallized from isopropyl alcohol to give colorless crystals, M.P. 211°–212° C. (decomp.).

EXAMPLE 31

Using the procedure similar to that in Example 30, but replacing 2-(β-diethylaminoethylamino)-5-chloro-2'-fluorobenzophenone hydrochloride by 2-(β-diethylaminoethylamino) - 5,2'-dichlorobenzophenone hydrochloride, there is obtained 1-(β-diethylaminoethyl)-5-(o-chlorophenyl) - 7 - chloro-1,3-dihydro-2H-1,4-benzodiazepin-2-one, which is recrystallized from hexane, M.P. 68°–70° C.

EXAMPLE 32

Using the procedure similar to that in Example 30, but replacing 2-(β-diethylaminoethylamino) - 5 - chloro-2'-fluorobenzophenone hydrochloride by 2 - (β - diethylaminoethylamino) - 5 - nitrobenzophenone hydrochloride, there is obtained 1-(β-diethylaminoethyl) - 5 - phenyl-7-nitro - 1,3 - dihydro - 2H - 1,4 - benzodiazepin-2-one dihydrochloride, which is recrystallized from methanol-ether, M.P. 232°–233° C. (decomp.).

EXAMPLE 33

Using the procedure similar to that in Example 30, but replacing 2 - (β-diethylaminoethylamino)-5-chlorobenzophenone hydrochloride by 2-(β-diethylaminoethylamino)-5 - trifluoromethyl - benzophenone hydrochloride, there is obtained 1 - (β - diethylaminoethyl) - 5 - phenyl-7-trifluoromethyl - 1,3 - dihydro - 2H-1,4-benzodiazepin-2-one dihydrochloride, which is recrystallized from methanol-ether, M.P. 218°–221° C.

EXAMPLE 34

Using the procedure similar to that in Example 30, but replacing 2 - (β - diethylaminoethylamino) - 5-chloro-2'-fluorobenzophenone, hydrochloride by 2 - (γ - dimethylaminopropylamino) - 5 - chloro - 2' - fluorobenzophenone hydrochloride, there is obtained 1 - (γ - dimethylaminopropyl) - 5 - (o - fluorophenyl) - 7 - chloro-1,3-dihydro-2H - 1,4 - benzodiazepin - 2 - one dihydrochloride, which is recrystallized from methanol-ether, M.P. 202°–207° C. (decomp.).

EXAMPLE 35

Using the procedure similar to that in Example 30, but replacing 2 - (β - diethylaminoethylamino)-5-chloro-2'-fluorobenzophenone by 2 - [2 - (γ - dimethylaminopropylamino) - 5 - bromobenzoyl] - pyridine, there is obtained 1-(γ-dimethylaminopropyl) - 5 - (2' - pyridyl)-7-bromo-1,3 - dihydro - 2H - 1,4 - benzodiazepin-2-one dihydrochloride, M.P. 181°–183° C. (decomp.).

Similarly, the following compounds are prepared:

1-(3'-methylaminopropyl)-5-(o-fluorophenyl)-7-chloro-1,3-dihydro-2H-1,4-benzodiazepin-2-one dihydrochloride, M.P. 193°–196° C.

1-(3'-dimethylaminopropyl)-5-phenyl-7-chloro-1,3-dihydro-2H,1,4-benzodiazepin-2-one, M.P. 90°–92° C.

1-(2'-dimethylamino-1'-methylethyl)-5-phenyl-7-chloro-1,3-dihydro-2H-1,4-benzodiazepin-2-one dihydrochloride, M.P. 165°–168° C.

1-(2'-pyrrolidinoethyl)-5-phenyl-7-chloro-1,3-dihydro-2H-1,4-benzodiazepin-2-one maleate, M.P. 157°–159° C.

1-(2'-piperidinoethyl)-5-phenyl-7-chloro-1,3-dihydro-2H-1,4-benzodiazepin-2-one maleate, M.P. 172°–173° C.

1-(2'-morpholinoethyl)-5-phenyl-7-chloro-1,3-dihydro-2H-1,4-benzodiazepin-2-one, M.P. 144°–146° C.

1-[2'-(4''-methyl-1''-piperazinyl)ethyl]-5-phenyl-7-chloro-1,3-dihydro-2H-1,4-benzodiazepin-2-one, M.P. 159°–160° C.

1-[3'-(4''-[2''-ethoxyethyl]-1''-piperazinyl)-propyl]-5-(o-fluorophenyl)-7-chloro-1,3-dihydro-2H-1,4-benzodiazepin-2-one trimaleate, M.P. 129°–132° C.

7-chloro-5-phenyl-1-(β-methylthioethyl)-1,3-dihydro-2H-1,4-benzodiazepin-2-one hydrochloride, M.P. 165°–167° C. (decomp.)

7-chloro-5-phenyl-1-(β-ethoxyethyl)-1,3-dihydro-2H-1,4-benzodiazepin-2-one, M.P. 156°–158° C.

7-chloro-5-phenyl-1-(β-vinyloxyethyl)-1,3-dihydro-2H-1,4-benzodiazepin-2-one hydrochloride, M.P. 216°–218° C. (decomp.)

7-chloro-5-phenyl-1-(ethoxycarbonylmethyl)-1,3-dihydro-2H-1,4-benzodiazepin-2-one, M.P. 116°–117° C.

7-chloro-5-phenyl-1-(β-acetoxyethyl)-1,3-dihydro-2H-1,4-benzodiazepin-2-one, M.P. 102°–103° C.

1-(β-acetoxyethyl)-5-(o-fluorophenyl)-7-chloro-1,3-dihydro-2H-1,4-benzodiazepin-2-one, M.P. 103°–105° C.

1-(β-acetoxyethyl)-5-(o-fluorophenyl)-1,3-dihydro-2H-1,4-benzodiazepin-2-one, M.P. 135°–137° C.

1-β-(3',4',5'-trimethoxybenzoyloxyethyl)-5-(o-fluorophenyl)-7-chloro-1,3-dihydro-2H-1,4-benzodiazepin-2-one, M.P. 161°–163° C.

1-(β-ethoxyacetoxyethyl)-5-(o-fluorophenyl)-1,3-dihydro-2H-1,4-benzodiazepin-2-one, M.P. 154°–158° C.

1-(β-nicotinoyloxyethyl)-5-o-fluorophenyl)-7-chloro-1,3-dihydro-2H-1,4-benzodiazepin-2-one, M.P. 138°–140° C.

1-(β-isonicotinoyloxyethyl)-5-(o-fluorophenyl)-7-chloro-1,3-dihydro-2H-1,4-benzodiazepin-2-one, M.P. 139°–142° C.

EXAMPLE 36

To a solution of 0.7 g. 2-(cyanomethylamino)-5-chlorobenzophenone in dry methylene chloride is added 0.7 g. of oxazolid-2,5-dione. To the mixture is added 7 ml. of ethereal hydrogen chloride below 5° C. The mixture is stirred at 0–5° C. and then at room temperature. The reaction mixture is poured into ice-water, neutralized with aqueous ammonia and extracted with methylene chloride. The methylene chloride extracts are combined and dried over sodium sulfate, and the solvent is removed to give 1-cyanomethyl-5-phenyl-7-chloro-1,3-dihydro-2H-1,4-benzodiazepin-2-one. This material is dissolved in ether and treated with ethereal hydrogen chloride to give the hydrochloride. Recrystallization from chloroform-isopropyl alcohol gives 1-cyanomethyl-5-phenyl-7-chloro-1,3-dihydro-2H-1,4-benzodiazepin-2-one dihydrochloride, as colorless prisms, M.P. 219°–221° C. (decomp.).

EXAMPLE 37

Using the procedure similar to that in Example 36, but replacing 2-(cyanomethylamino)-5-chloro-benzophenone by 2-(cyanomethylamino)-5-nitrobenzophenone, there is obtained 1-cyanomethyl-5-phenyl-7-nitro-1,3-dihydro-2H-1,4-benzodiazepin-2-one. Recrystallization from ethanol gives crystals, M.P. 207°–208° C. (decomp.).

Similarly, the following compounds are prepared:

7-chloro-1-(N,N-diethylcarbamoylmethyl)-5-phenyl-1,3-dihydro-2H-1,4-benzodiazepin-2-one, M.P. 146°–148° C.

7-chloro-1-(N,N-dimethylcarbamoylmethyl)-5-phenyl-1,3-dihydro-2H-1,4-benzodiazepin-2-one, M.P. 178°–180° C.

7-chloro-1-(N-methylcarbamoylmethyl)-5-(o-fluorophenyl)-1,3-dihydro-2H-1,4-benzodiazepin-2-one, M.P. 212°–214° C.

7-chloro-1-(N-ethylcarbamoylmethyl)-5-phenyl-1,3-dihydro-2H-1,4-benzodiazepin-2-one, M.P. 210°–212° C.

7-chloro-1-(N-methylcarbamoylmethyl)-5-phenyl-1,3-dihydro-2H-1,4-benzodiazepin-2-one, M.P. 253°–254° C.

1-carbamoylmethyl-7-chloro-5-phenyl-1,3-dihydro-2H-1,4-benzodiazepin-2-one, M.P. 234°–235° C.

What is claimed is:

1. A process for producing a benzodiazepine, or acid addition salt thereof, represented by the formula:

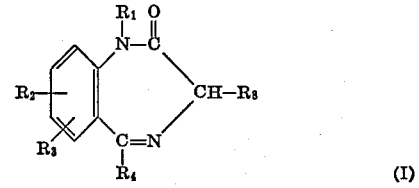

wherein $R_1$ represents hydrogen, $C_{1-4}$ alkyl, $C_{2-4}$ alkenyl, $C_{3-4}$ alkynyl, or a group of the formula —$C_nH_{2n}$·$R_5$ wherein $n$ is an integer of 1 to 4 and $R_5$ represents halogen; trifluoromethyl; cyano; $C_{3-7}$ cycloalkyl; $C_{1-4}$ alkoxy; $C_{1-4}$ alkylthio; $C_{2-4}$ alkenyloxycarbamoyl; $C_{1-4}$ alkylcarbamoyl; acetyloxy, propionyloxy, benzoyloxy, halobenzoyloxy, methoxybenzoyloxy, dimethoxybenzoyloxy, trimethoxybenzoyloxy, phenylacetyloxy, nicotinoyloxy, isonicotinoyloxy; $C_{1-4}$ alkyl-carbonyl; phenyl; substituted phenyl; or $R_5$ represents a group represented by the formula:

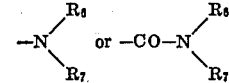

wherein $R_6$ represents hydrogen or $C_{1-3}$ alkyl and $R_7$ represents $C_{1-3}$ alkyl; provided that $R_6$ and $R_7$ together with the adjacent nitrogen atom may form a pyrrolidino, piperidino, piperazino, alkyl-piperazino, alkyloxyalkyl-piperazino or morpholino group; $R_2$ represents hydrogen, halogen $C_{1-4}$ alkyl, nitro, cyano, trifluoromethyl, trifluoromethoxy, di-($C_{1-4}$ alkyl)amino, piperidino, $C_{1-4}$ alkoxy, $C_{1-4}$ alkylthio, $C_{1-4}$ alkylsulfonyl, $C_{1-4}$ alkylsulfinyl, carbamoyl or sulfamoyl; $R_3$ represents hydrogen, nitro $C_{1-4}$ alkyl or halogen; $R_4$ represents $C_{1-4}$ alkyl; $C_{3-7}$ cycloalkyl; cycloalkenyl; phenyl; phenyl substituted with up to three substituents selected from the group consisting of halogen, nitro, trifluoromethyl, $C_{1-4}$ alkoxy, $C_{1-4}$ alkyl and sulfamoyl; phenyl $C_{1-3}$ alkyl; pyridyl, pyrimidyl, pyridazinyl, pyrazinyl, thienyl, furyl, thiazoyl, oxazoyl, indolyl or a halogen- or alkyl-substituted group thereof; $R_8$ represents hydrogen, $C_{1-4}$ alkyl, $C_{1-4}$ alkoxy-$C_{1-4}$ alkyl, $C_{1-4}$ alkylthio-$C_{1-4}$ alkyl, phenyl, phenyl substituted by halogen or $C_{1-2}$ alkoxy, benzyl or hydroxybenzyl; which comprises reacting, in a solvent or solvent mixture and in the presence of an acid, aminophenyl ketone derivative represented by the formula:

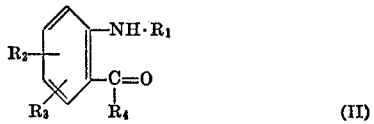

(II)

wherein $R_1$, $R_2$, $R_3$ and $R_4$ are the same as defined above, with a 2,5-dione derivative represented by the formula:

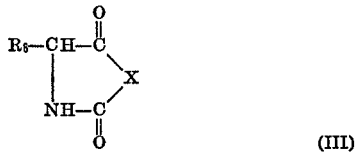

(III)

wherein $R_8$ is the same as defined above, and X represents oxygen or sulfur and, if desired, converting the benzodiazepine obtained into its acid addition salt by reacting it with an inorganic or organic acid.

2. A process according to claim 1, wherein the solvent is chloroform, carbon tetrachloride, methylene chloride, ethylene chloride, diethyl ether, diisopropyl ether, tetrahydrofuran, dioxane, water, methanol, ethanol, dimethylformamide or dimethyl sulfoxide or mixture thereof.

3. A process according to claim 1, wherein the acid is hydrogen chloride, hydrogen bromide, sulfuric acid, phosphoric acid, polyphosphoric acid, boron trifluoride or paratoluenesulfonic acid.

4. A process according to claim 1, wherein the reaction is carried out at a temperature ranging from −25° C. to +120° C.

5. A process according to claim 1, wherein the reaction is carried out at a temperature ranging from 0° C. to 30° C.

6. A process according to claim 1, wherein at least 1 mole of the 2,5-dione derivative is used per mole of the aminophenyl ketone derivative.

References Cited

UNITED STATES PATENTS

| | | | |
|---|---|---|---|
| 2,647,907 | 8/1953 | Richardson | 260—482 |
| 2,716,647 | 8/1955 | Richardson | 260—482 |
| 3,371,085 | 2/1968 | Reeder et al. | 260—239.3 D |
| 3,391,138 | 7/1968 | Archer et al. | 260—239.3 D |
| 3,539,602 | 11/1970 | Jöhl et al. | 260—482 |
| 3,541,135 | 11/1970 | Jöhl et al. | 260—482 |

OTHER REFERENCES

Elderfield: "Heterocyclic Compounds," vol. 5, pp. 405–408, 716–722 (Wiley) (1957).

Burger: "Medicinal Chemistry," 2nd ed., pp. 72–81 (Interscience) (1960).

HENRY R. JILES, Primary Examiner

R. T. BOND, Assistant Examiner

U.S. Cl. X.R.

260—302 R, 301 R, 326.15, 247.7, 293.67, 293.68, 293.69, 293.76, 293.79, 268 FT, 268 H, 268 C, 268 R, 247.5, 307 A, 307 B, 307 C, 570 AB, 296 R, 256.4 C, 250 A, 250 R, 332.3 R, 347.7, 326.5 D, 295.5 R, 326.5 G, J, 326.5 J, 295 R; 424—244, 248, 250, 251, 263, 267, 270, 272, 274, 275, 285